(12) United States Patent
Ewert

(10) Patent No.: US 10,199,806 B2
(45) Date of Patent: Feb. 5, 2019

(54) VEHICLE MOUNTED BOOM ASSEMBLY WITH A WASHER ATTACHMENT

(71) Applicant: LinePro Equipment Ltd., Lake Country (CA)

(72) Inventor: Larry Ewert, Lake Country (CA)

(73) Assignee: LinePro Equipment Ltd., Lake Country (CA)

( * ) Notice: Subject to any disclaimer, the term of this patent is extended or adjusted under 35 U.S.C. 154(b) by 0 days.

(21) Appl. No.: 15/310,413

(22) PCT Filed: May 12, 2015

(86) PCT No.: PCT/CA2015/050430
§ 371 (c)(1),
(2) Date: Nov. 10, 2016

(87) PCT Pub. No.: WO2015/172248
PCT Pub. Date: Nov. 19, 2015

(65) Prior Publication Data
US 2017/0237242 A1 Aug. 17, 2017

Related U.S. Application Data

(60) Provisional application No. 61/991,716, filed on May 12, 2014.

(51) Int. Cl.
*B24C 3/06* (2006.01)
*H02G 1/02* (2006.01)
(Continued)

(52) U.S. Cl.
CPC .............. *H02G 1/02* (2013.01); *B08B 3/02* (2013.01); *B08B 5/02* (2013.01); *B24C 1/003* (2013.01);
(Continued)

(58) Field of Classification Search
CPC ... B24C 3/06; B24C 1/00; B66F 11/00; B08B 5/02; H02G 1/02
(Continued)

(56) References Cited

U.S. PATENT DOCUMENTS 4,477,289 A 10/1984 Kurtgis
6,464,569 B1 * 10/2002 Thierer .................. B24C 3/065
451/38
(Continued)

FOREIGN PATENT DOCUMENTS

CA 2049220 A1 2/1992
CN 203565427 U 4/2014
(Continued)

OTHER PUBLICATIONS

Machine translation of Chinese Patent No. 203565427 U to Zhi et al., obtained from the Canadian Intellectual Property Office in its capacity as an International Search Authority, which was published on Apr. 30, 2014.
(Continued)

*Primary Examiner* — Robert Rose

(57) ABSTRACT

An articulated boom assembly comprises a base and a primary boom arm extending from the base. There is a power system for actuating the primary boom arm between an extended position and a retracted position. There is an attachment operatively connected to the primary boom arm which supports a nozzle. The attachment may include an actuating mechanism for reciprocating the nozzle along the length of the attachment.

12 Claims, 9 Drawing Sheets

(51) Int. Cl.
 *B08B 3/02*     (2006.01)
 *B08B 5/02*     (2006.01)
 *B24C 1/00*     (2006.01)
 *B66F 11/00*     (2006.01)
 *B60P 3/30*     (2006.01)

(52) U.S. Cl.
 CPC ............. *B24C 3/06* (2013.01); *B66F 11/00* (2013.01); *B08B 2203/02* (2013.01); *B60P 3/30* (2013.01)

(58) Field of Classification Search
 USPC .................... 451/75, 78, 92, 102, 39, 40
 See application file for complete search history.

(56) References Cited

U.S. PATENT DOCUMENTS

| | | | |
|---|---|---|---|
| 6,749,490 B1 * | 6/2004 | Hafenrichter | B24C 1/045 451/2 |
| 7,291,056 B2 * | 11/2007 | Ohishi | B08B 3/02 451/5 |

FOREIGN PATENT DOCUMENTS

| | | |
|---|---|---|
| FR | 2674559 B1 | 7/1993 |
| JP | H0718880 | 1/1995 |
| JP | 2003217374 A | 7/2003 |
| WO | 9504203 A1 | 9/1995 |
| WO | 2011061347 A2 | 5/2011 |

OTHER PUBLICATIONS

Machine translation of Japanese Patent No. JPH0718880 to Sakamoto et al., obtained from the Canadian Intellectual Property Office in its capacity as an International Search Authority, which was published on Jan. 20, 1995.

Machine translation of Japanese Patent Publication No. 2003217374 to Kuriyama, obtained from the Canadian Intellectual Property Office in its capacity as an International Search Authority, which was published on Jul. 31, 2003.

Machine translation of International Patent Application Publication No. 2011061347 to Wocken, obtained from the Canadian Office, which was published on May 26, 2011.

WIPO, Canadian International Searching Authority, "International Search Report" fo International Patent Application No. PCT/CA2015/050430, which was dated Jul. 23, 2015.

WIPO, Canadian International Searching Authority, "Written Opinion of the International Searching Authority" for International Patent Application No. PCT/CA2015/050430, dated Jul. 23, 2015.

Machine translation of the abstract of French Patent No. 2674559 B1 to Gerard, obtained from Espacenet, as published on Jul. 9, 1993.

Machine translation of the claims of French Patent No. 2674559 B1 to Gerard, obtained from Espacenet, as published on Jul. 9, 1993.

Machine translation of the description of French Patent No. 2674559 B1 to Gerard, obtained from Espacenet, as published on Jul. 9, 1993.

\* cited by examiner

VEHICLE MOUNTED BOOM ASSEMBLY WITH A WASHER ATTACHMENT

BACKGROUND OF THE INVENTION

Field of the Invention

The present invention relates to a boom assembly and, in particular, to an articulated boom assembly which is mounted on a vehicle and provided with an attachment for washing insulating components of high voltage transmission lines.

Description of the Related Art

U.S. Pat. No. 4,477,289, which issued to Kurtgis on Oct. 16, 1984, discloses a system for washing insulating components of high voltage and extra high voltage transmission lines. A helicopter provides an airborne, mobile, ungrounded, integrally bonded platform for a pressurized spray washing apparatus. The ungrounded helicopter hovers adjacent to the high voltage power lines to allow an articulating boom to be positioned to utilize a directed spray to pressure wash contamination from the insulators. A washing fluid tank and pump assembly contained in the helicopter provides high pressure washing fluid to the articulating boom and provides a self-contained system. Electrical bonding between the ungrounded helicopter and all wash apparatus components permits the helicopter to sustain prolonged energized contact with high voltage transmission source without incurring any adverse effect on the transmission line system, the aircraft or operators.

SUMMARY OF THE INVENTION

It is an object of the present invention to provide an improved articulated boom assembly which is provided with an attachment for washing insulating components of high voltage transmission lines.

There is accordingly provided an articulated boom assembly comprising a base and a primary boom arm extending from the base. There is a power system for actuating the primary boom arm between an extended position and a retracted position. An attachment is operatively connected to the primary boom arm and supports a nozzle.

The attachment may include an actuating mechanism for reciprocating the nozzle along the length of the attachment. The power system for actuating the primary boom arm may be a hydraulic system and the actuating mechanism for reciprocating the nozzle may be independent of the power system. The nozzle may be mounted on a nozzle unit which has a first jaw member and a second jaw member. The first jaw member and the second jaw member may have respective ends thereof. The nozzle unit may be moveable between an open configuration, in which the ends of the first jaw member and the second jaw member are spaced-apart, and a closed configuration in which the ends of the first jaw member and the second jaw member are adjacent to each other. The attachment may be operatively connected to the primary boom arm by an actuator.

There may be a secondary boom arm pivotably coupled to the primary boom arm. The attachment may be operatively connected to the primary boom arm by the secondary boom arm. The power system for actuating the primary boom arm may be a hydraulic system and the secondary boom arm may be pivoted by the power system. The attachment may be operatively connected to the secondary boom arm by an actuator. The actuating mechanism for reciprocating the nozzle may be independent of the power system for actuating the primary boom arm and pivoting the secondary boom arm. There may be an actuator near a proximal end of the secondary boom arm for pivoting the secondary boom arm relative to the primary boom arm.

There is also provided an articulated boom assembly comprising a base, a primary boom arm extending from the base and a secondary boom arm pivotably coupled to the primary boom arm. There is a power system for actuating the primary boom arm between an extended position and a retracted position, and for pivoting the secondary boom arm. There is an attachment operatively connected to the secondary boom arm which includes a first jaw member, a second jaw member and a plurality of nozzles which are spaced-apart on the first jaw member and the second jaw member. The attachment may include an actuating mechanism for reciprocating the first jaw member and the second jaw member along the length of the attachment.

The actuating mechanism for reciprocating the first jaw member and the second jaw member may be independent of the power system for actuating the primary boom arm and pivoting the secondary boom arm. The first jaw member and the second jaw member may have respective ends thereof. The first jaw member and the second jaw member may be moveable between an open configuration, in which the ends of the first jaw member and the second jaw member are spaced-apart, and a closed configuration in which the ends of the first jaw member and the second jaw member are adjacent to each other. The attachment may be operatively connected to the secondary boom arm by an actuator. The plurality of nozzles may be directed inwardly towards an interior space of the nozzle unit.

There is further provided an attachment for a boom assembly comprising a first jaw member and a second jaw member, each having an end thereof. A plurality of nozzles is spaced-apart on the first jaw member and the second jaw member. There is an actuating mechanism for reciprocating the first jaw member and the second jaw member along the length of the attachment. The first jaw member and the second jaw member are moveable between an open configuration, in which the ends of the first jaw member and the second jaw member are spaced-apart, and a closed configuration in which the ends of the first jaw member and the second jaw member are adjacent to each other. The first jaw member and the second jaw member may each have a shield member. The plurality of nozzles may be spaced-apart on the shield members.

There is still further provided a method of washing an insulating component comprising aligning a washer attachment of a boom assembly with the insulating component. A nozzle unit mounted on the washer attachment is actuated to surround the insulating component. The insulating component is sprayed with pressurized washing medium from a nozzle supported on the nozzle unit. The nozzle unit may be reciprocated along the length of the washer attachment. The pressurized washing medium may be sprayed inwardly towards an interior space of the nozzle unit. The pressurized washing medium may be a mixture of compressed gas and carbon dioxide pellets.

BRIEF DESCRIPTIONS OF DRAWINGS

The invention will be more readily understood from the following description of the embodiments thereof given, by way of example only, with reference to the accompanying drawings, in which.

Figure 1:
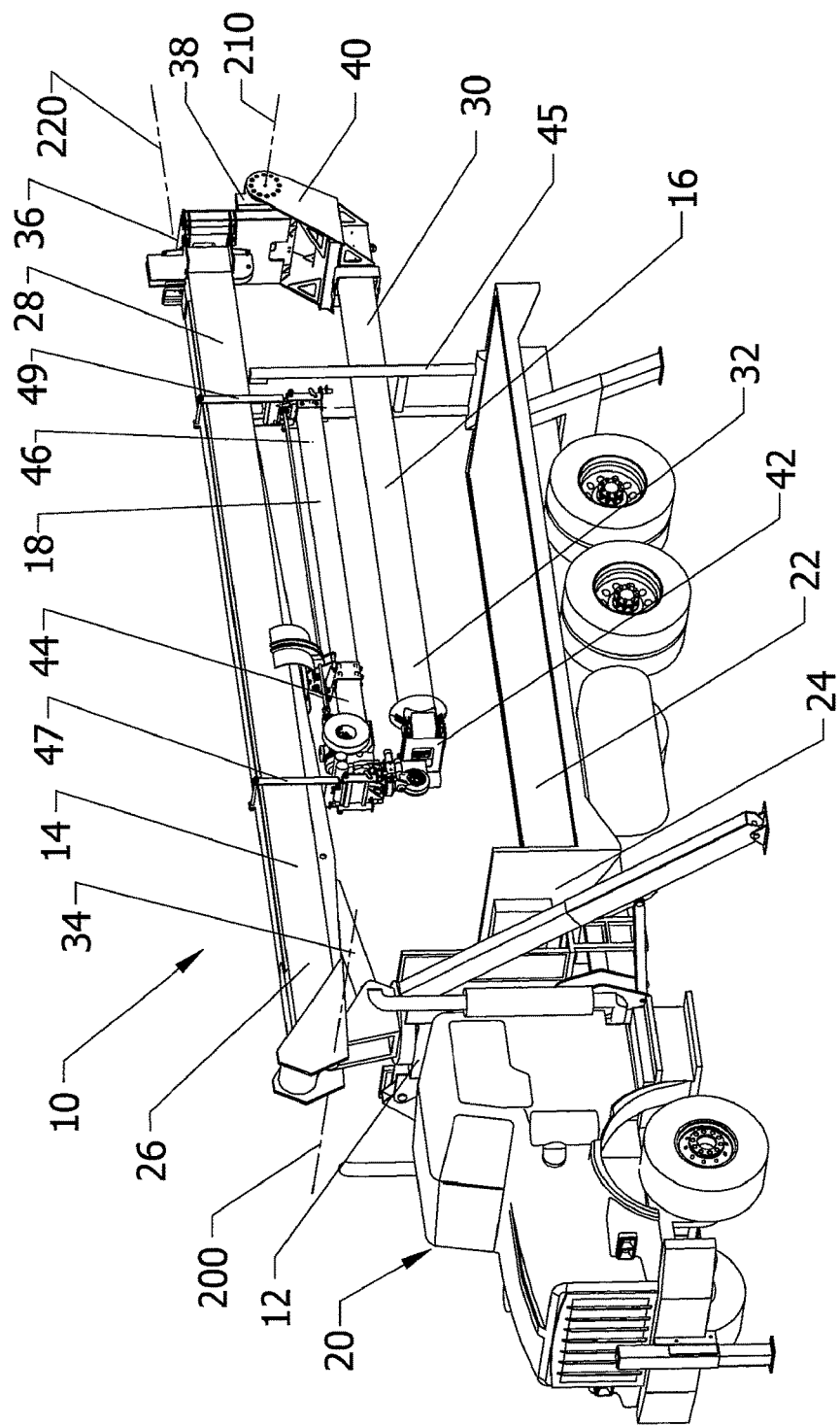
FIG. 1 is a perspective view showing an improved boom assembly mounted on a vehicle, the assembly being in a retracted or stowed position.
Figure 8:
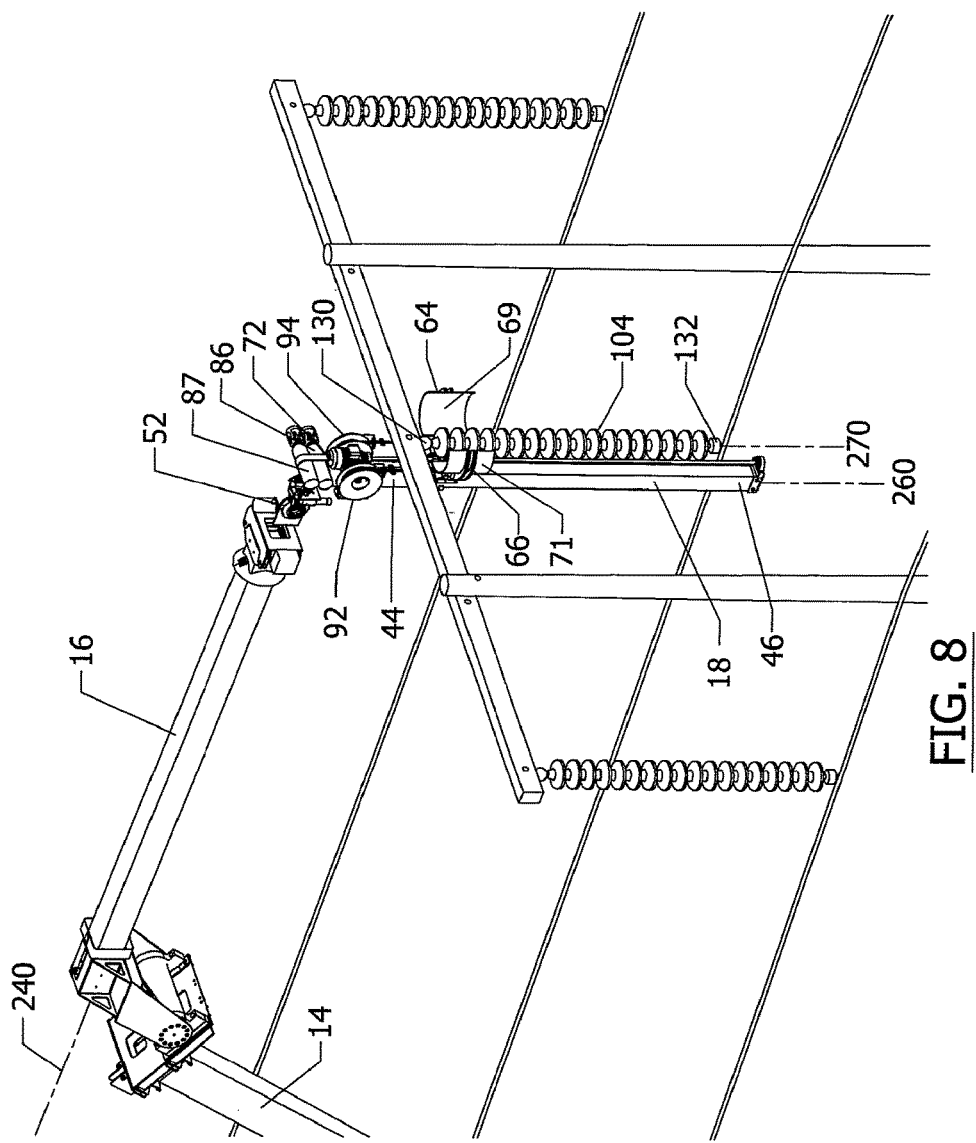
FIG. 8 is another perspective view of the dielectric boom arm and the washer attachment of the boom assembly of FIG. 1 showing the nozzle unit of the washer attachment in use with the insulator and in the open configuration.
Figure 9:
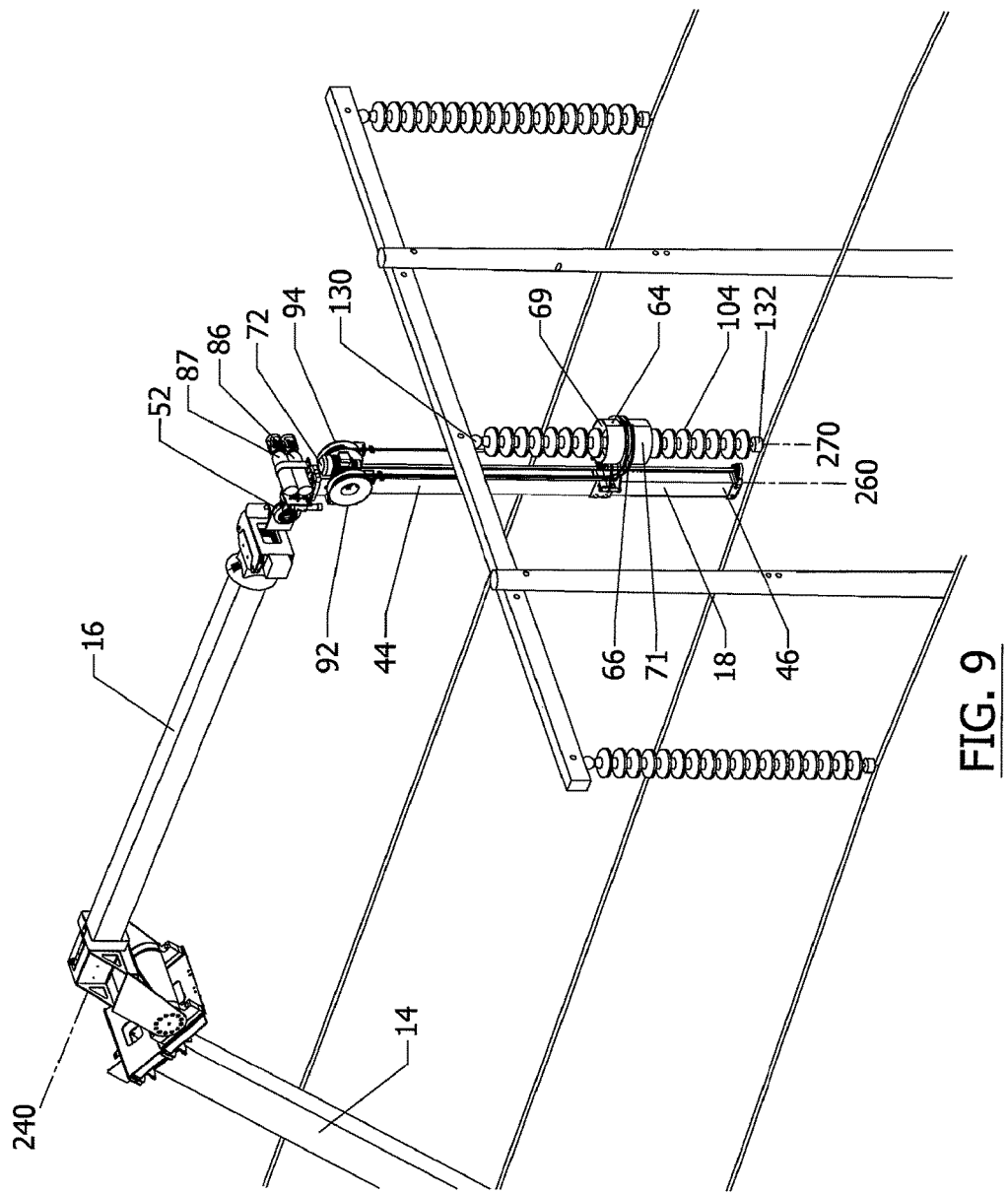
Figure 10:
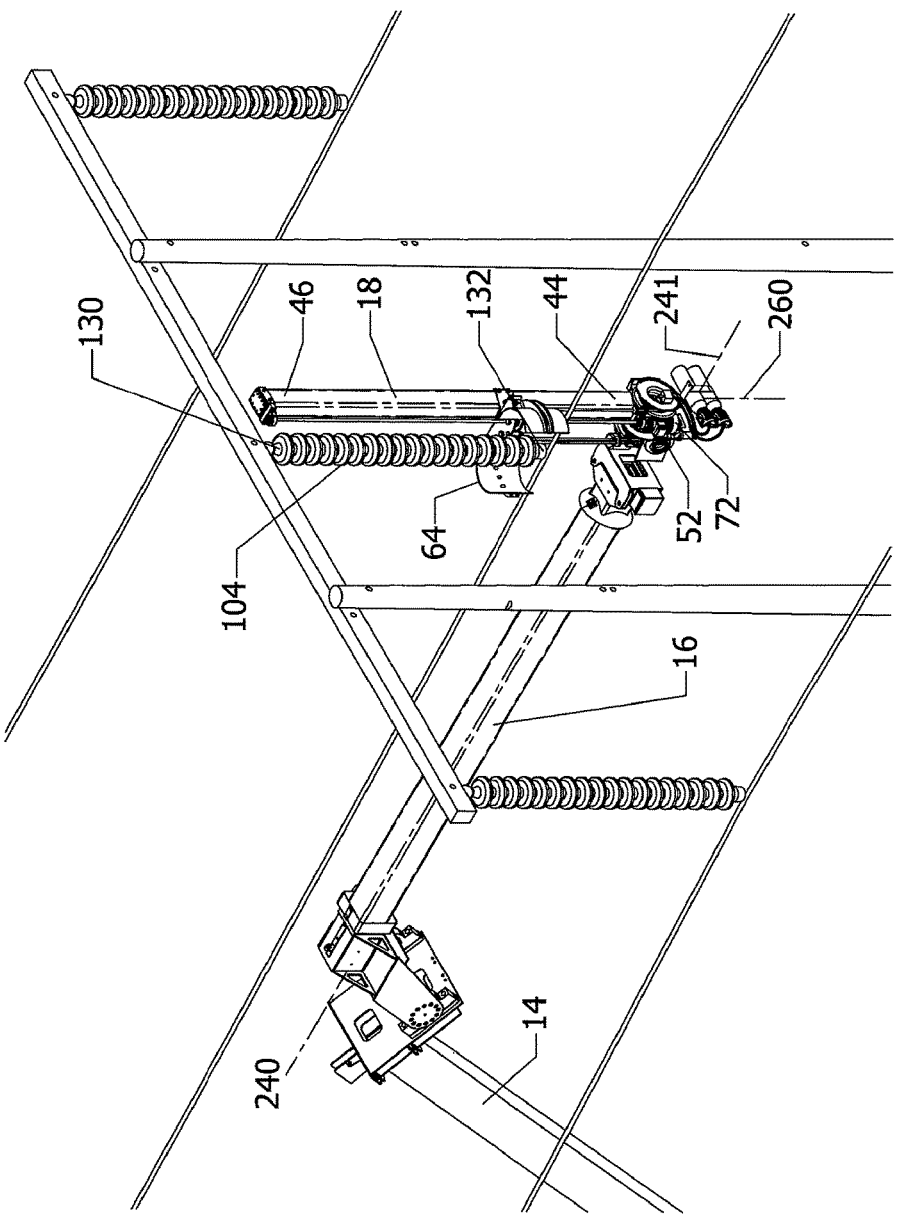

FIG. 9 is another perspective view of the dielectric boom arm and the washer attachment of the boom assembly of FIG. 1 showing the nozzle unit of the washer attachment in use with the insulator and in the closed configuration; and FIG. 10 is a perspective view of the dielectric boom arm and the washer attachment of the boom assembly of FIG. 1 showing the washer attachment pivoted 180° and rotated 90° from the position shown in FIG. 8.

DESCRIPTIONS OF THE PREFERRED EMBODIMENTS

Referring to the drawings and first to FIG. 1, a boom assembly 10 is shown. The boom assembly 10 generally includes a base 12, a first boom arm which in this example is a telescopic boom arm 14, a second boom arm which in this example is a dielectric boom arm 16, and an attachment which in this example is a dielectric washer attachment 18. The boom assembly 10 is mounted on a vehicle 20 and, in particular, the base 12 of the boom assembly is mounted on a flatbed 22 of the vehicle near a front end 24 thereof in a conventional manner. The boom assembly 10 is rotatably mounted on the vehicle 20 in this example. However, in other examples, the boom assembly may be fixedly mounted on the vehicle. The boom assembly may also be mounted near a rear end of the vehicle.

The telescopic boom arm 14 has a proximal end 26, which is proximal relative to the base 12, and a distal end 28 which is distal relative to the base 12. Likewise, the dielectric boom arm 16 has a proximal end 30, which is proximal relative to the distal end 28 of the telescopic boom arm 14, and a distal end 32 which is distal relative to the distal end 28 of the telescopic boom arm 14. Similarly, the washer attachment 18 has a proximal end 44, which is proximal relative to the distal end 32 of the dielectric boom arm 16, and a distal end 46 which is distal relative to the distal end 32 of the dielectric boom arm 16. The proximal end 26 of the telescopic boom arm 14 is pivotably coupled to the base 12 in a conventional manner and there is an actuator 34 which functions to pivot the telescopic boom arm 14 about a horizontal pivot axis 200. Hydraulic extension cylinders and cables within the telescopic boom arm 14 move the telescopic boom arm between an extended position and a retracted position in a conventional manner. A first support bracket 45 and a second support bracket 47 may be used to restrict movement of the dielectric boom arm 16 during transport. A third support bracket 49 may be used to restrict movement of the washer attachment 18 during transport.

Figure 2:
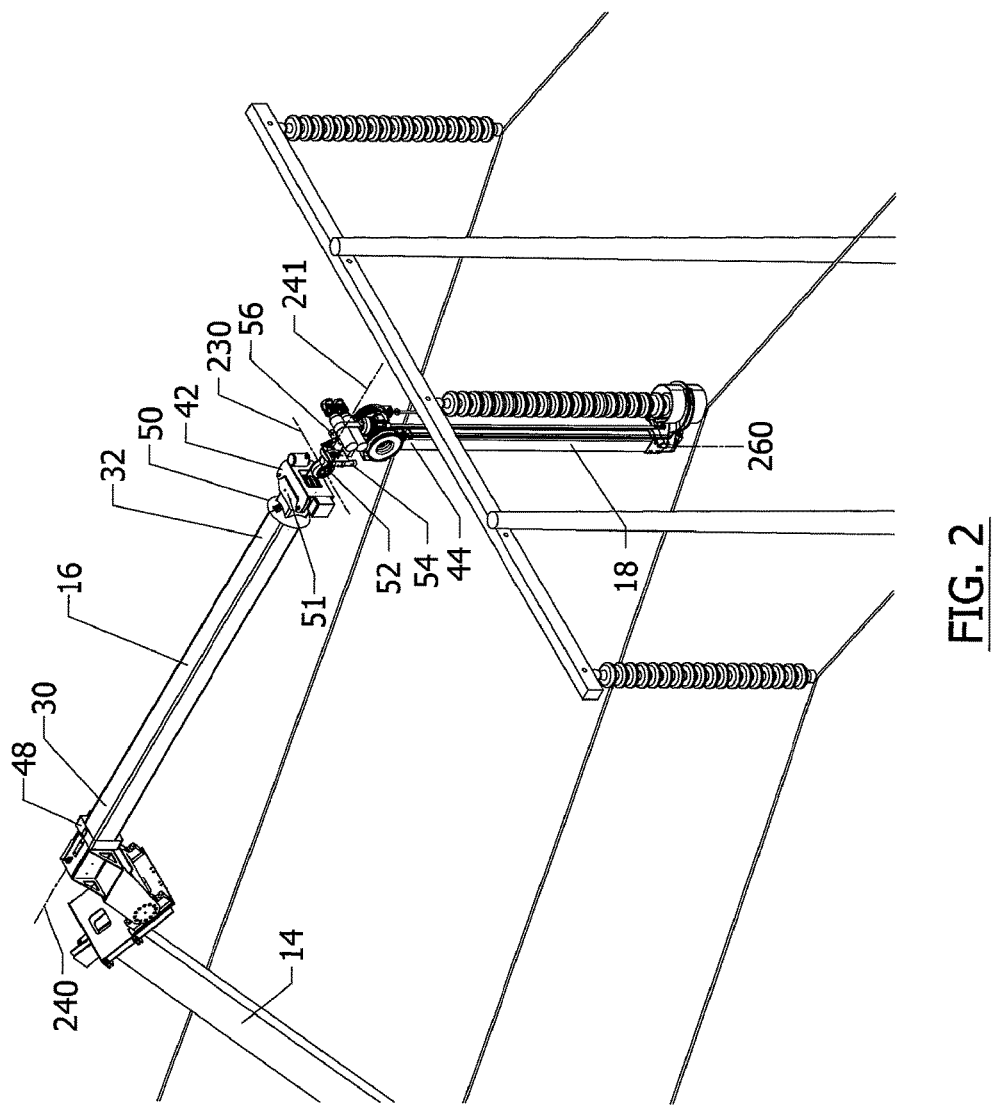
FIG. 2 is a perspective view of a dielectric boom arm and a washer attachment of the boom assembly of FIG. 1 showing a nozzle unit of the washer attachment in use with an insulator.

There is a bracket 36 mounted on the telescopic boom arm 14 at the distal end 28 thereof. The bracket 36 supports an actuator 38 which, in this example, is in the form of a helical, hydraulic rotary actuator. The proximal end 30 of the dielectric boom arm 16 is coupled to the actuator 38. The actuator 38 imparts rotary motion to the dielectric boom arm 16 such that the dielectric boom arm is pivotable about a pivot axis 210 which is substantially perpendicular to a longitudinal axis 220 of the telescopic boom arm 14. The actuator 38 is coupled to the dielectric boom arm 16 by a bracket 40. The distal end 32 of the dielectric boom arm 16 is coupled to the washer attachment 18 by a bracket 42 mounted on the washer attachment at the proximal end 44 thereof. As best shown in FIG. 2, the bracket 42 is coupled to a sleeve 51 at the distal end 32 of the dielectric boom arm 16. The sleeve 51 is made of steel in this example but may be any suitable material.

Referring now to FIG. 2, the dielectric boom arm 16 is dielectrically insulated from a conductive shield 48 at the proximal end 30 thereof to a gradient control device 50 at the distal end 32 thereof. The gradient control device 50 has a tapered cone shape with a sharp outer edge in this example. The purpose of the gradient control device 50 is to restrict corona streamers from encroaching on an insulated portion of the dielectric boom arm 16. All conductive components mounted distally of the gradient control device 50 should be electrically bonded to the gradient control device but should not encroach on the gradient control device during operation of the dielectric boom arm 16.

Figure 3:
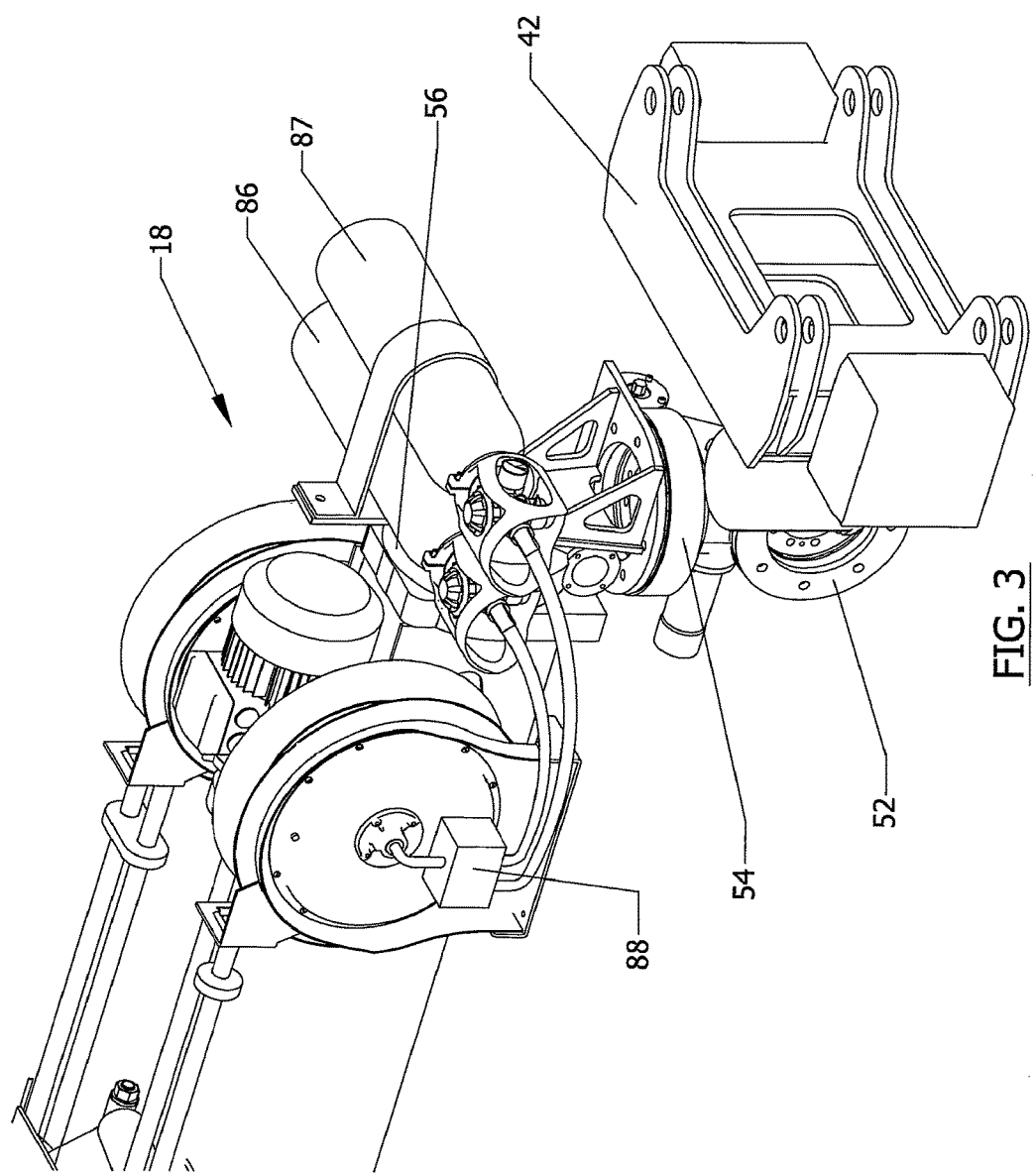
FIG. 3 is a perspective view showing actuators which operatively connect the washer attachment to the dielectric boom arm.

The washer attachment 18 is operatively connected to the dielectric boom arm 16 so as to permit certain degrees of freedom. In this example, degrees of freedom along three axes are achieved by coupling actuators 52, 54 and 56 together as best shown in FIG. 3. The actuators 52, 54 and 56 in this example are in the form of slew drive actuators but may be other suitable actuators. Referring back to FIG. 2, the actuator 52 is supported by the bracket 42 mounted on the proximal end 44 of the washer attachment 18. The actuator 52 imparts rotary motion to the washer attachment 18 such that the washer attachment is pivotable about a pivot axis 230 which is substantially perpendicular to a longitudinal axis 240 of the dielectric boom arm 16. The actuator 54 is coupled to the actuator 52 and imparts rotary motion to the washer attachment 18 such that the washer attachment is pivotable about an axis 241 which is perpendicular to the pivot axis 230. The actuator 56 is coupled to the actuator 54 and imparts rotary motion to the washer attachment 18 such that the washer attachment is rotatable about a longitudinal axis 260 thereof. The actuators 52, 54 and 56 in this example are powered by batteries 76 and 78, best shown in FIG. 4, independently of the power system for actuating the telescopic boom arm 14 and pivoting the dielectric boom arm 16. However, in other examples, the actuators 52, 54 and 56 may be powered by the power system for actuating the telescopic boom arm 14 and pivoting the dielectric boom arm 16.

Figure 4:
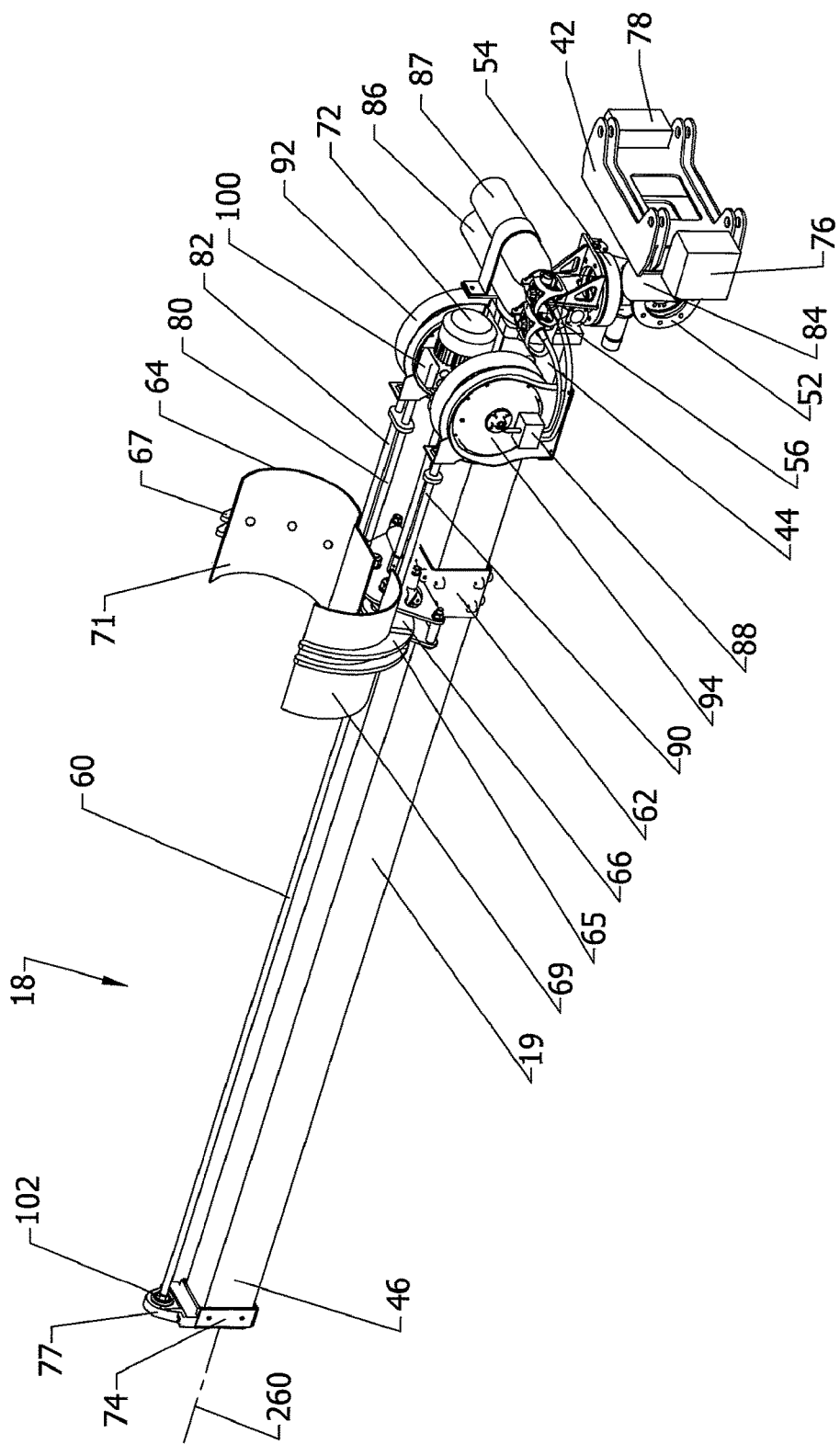
FIG. 4 is a perspective view of the washer attachment of FIG. 2.
Figure 7:
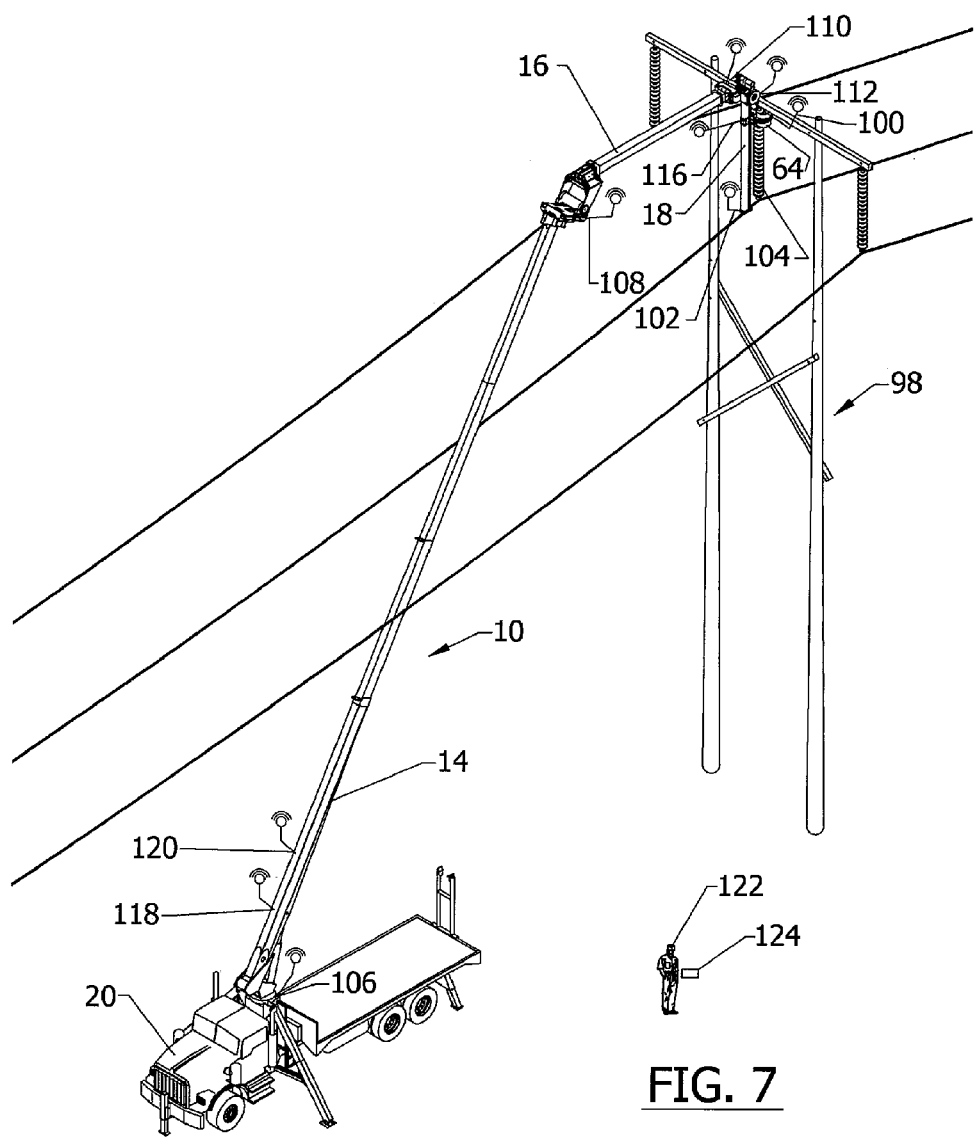
FIG. 7 is a perspective view of the boom assembly of FIG. 1 mounted on the vehicle in an extended position with the dielectric boom arm in a horizontal orientation and the washer attachment in a vertical orientation.

Referring now to FIG. 4, the washer attachment 18 is shown in greater detail and includes a boom arm 19. An actuator 72, which in this example is in the form of an electric motor actuator, is mounted on the proximal end 44 of the washer attachment 18. There is a threaded rod 60 which is coupled to the actuator 72. In this example, the threaded rod 60 is dielectric and made of fiberglass. The threaded rod 60 extends along the length of the boom arm 19, parallel to the longitudinal axis 260, to a bearing 77 mounted on an end bracket 74 at the distal end 46 of the washer attachment 18. The threaded rod 60 is threadedly received by a bracket 62 which supports a nozzle unit 64. The actuator 72 imparts rotary motion to the threaded rod 60 such that the threaded rod is rotatable about a longitudinal, central axis thereof which is parallel to the longitudinal axis 260 of the washer attachment 18. This causes the bracket 62 to reciprocate along the threaded rod 60 and the boom arm 19. The nozzle unit 64 can accordingly travel from the proximal end 44 of the washer attachment 18 to the distal end 46 of the washer attachment 18 and vice versa. The actuator 72 in this example is powered by the batteries 76 and 78 independently of the power system for actuating the telescopic boom arm 14 and pivoting the dielectric boom arm 16. However, in other examples, the actuator 72 may be powered by the power system for actuating the telescopic boom arm 14 and pivoting the dielectric boom arm 16. There is a sensor 102 mounted on the end bracket 74 which signals a position of the nozzle unit 64 along the length of the boom arm 19 to a controller 124 as shown in FIG. 7. This allows an operator 122 to have visual feedback while operating the nozzle unit 64 of the washer attachment 18 to wash an object, for example, an insulator 104.

Figure 6:
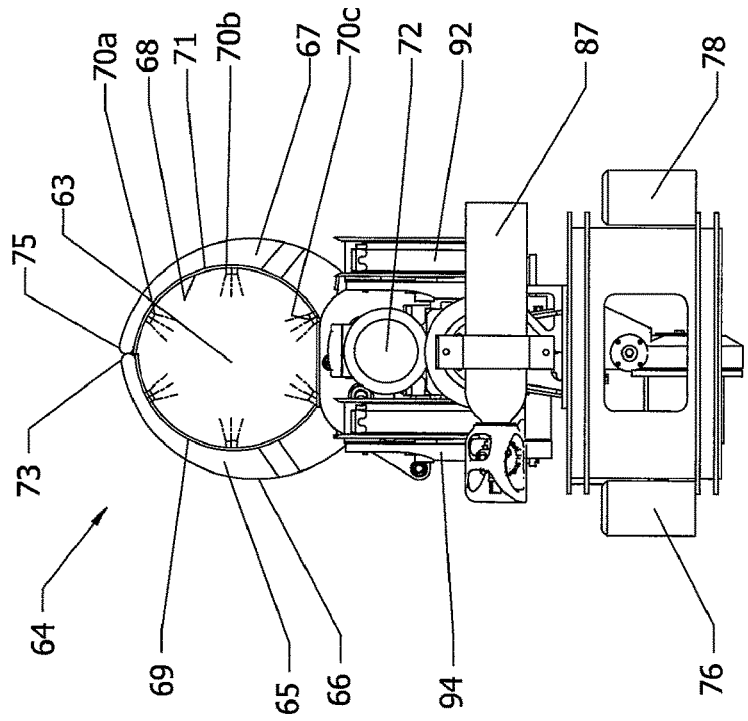
FIG. 6 is a rear elevation view of the washer attachment of FIG. 2 showing the nozzle unit in a closed configuration.
Figure 5:
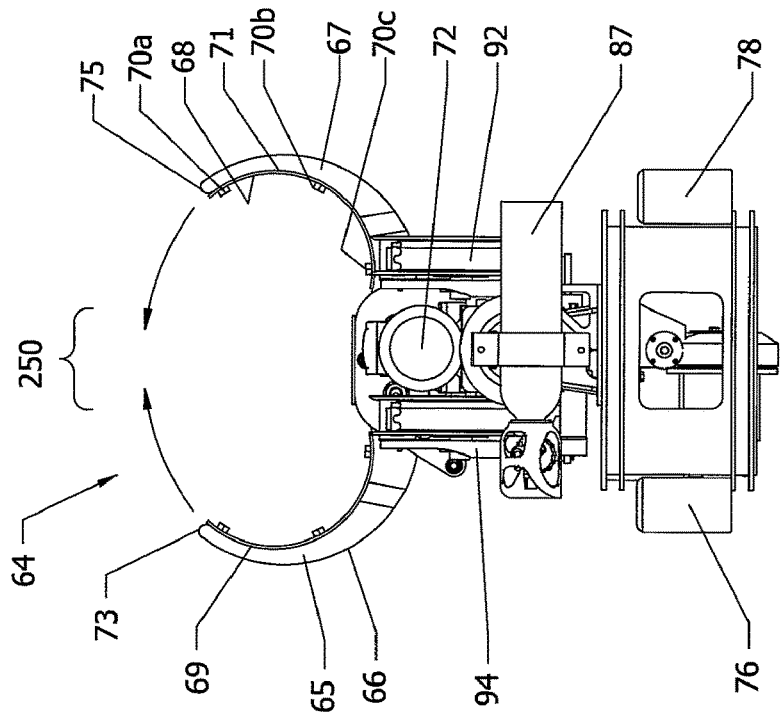
FIG. 5 is a rear elevation view of the washer attachment of FIG. 2 showing the nozzle unit in an open configuration.

As best shown in FIGS. 5 and 6, the nozzle unit 64 includes a washer claw 66. The washer claw 66 has a first jaw member 65 and a second jaw member 67 which support respective shields 69 and 71 as best shown in FIG. 4. The nozzle unit 64 is biased to an open configuration in which ends 73 and 75 of the respective jaw members 65 and 67 are spaced-apart as best shown in FIG. 5. However, the jaw members 65 and 67 are able to pivot towards each other as indicated generally by arrows 250. This allows the jaw members 65 and 67 to come together such that the ends 73 and 75 meet as shown in FIG. 6. In the closed configuration, the jaw members 65 and 67 define an interior space 63 of the washer claw 66. The washer claw 66 in this example is controlled by pumping dielectric hydraulic fluid through dielectric hoses 80 and 82 as shown in FIG. 4. However, the washer claw 66 may be controlled instead by a pneumatic system in which air is pumped through the dielectric hoses 80 and 82. Alternatively, the washer claw 66 may be controlled by a pressurized reservoir. In other examples, the washer claw 66 may be controlled by the power system for actuating the telescopic boom arm 14 and pivoting the dielectric boom arm 16. The dielectric hoses 80 and 82 in this example are twin hoses which retract into a retractable hose reel 92. The retractable hose reel 92 in this example is a spring-loaded hose reel. The dielectric hoses 80 and 82 extend along the washer attachment 18 in tandem with the nozzle unit 64 as the nozzle unit moves along the threaded rod 60 towards the distal end 46 of the washer attachment. Conversely, the dielectric hoses 80 and 82 retract into the retractable hose reel 92 in tandem with the nozzle unit 64 as the nozzle unit moves along the threaded rod 60 towards the proximal end 44 of the washer attachment. The dielectric hoses 80 and 82 are also connected to a hydraulic pump and tank 84. There is a sensor 100 mounted on the actuator 72 which signals a position of the nozzle unit 64 relative to an object to be washed, for example an insulator, to the controller 124 shown in FIG. 7. This allows the operator 122 to align the nozzle unit 64 of the washer attachment 18 with the insulator 104.

Referring back to FIGS. 5 and 6, the shields 69 and 71 include a plurality of radially spaced-apart nozzles on interiors thereof, for example, nozzles 70a, 70b and 70c on an interior 68 of the shield 71. The nozzles 70a, 70b and 70c are in fluid communication with canisters 86 and 87 which provide washing medium as shown in FIG. 4. In this example, the canister 86 contains compressed gas which may be created by an engine-driven compressor and the canister 87 contains carbon dioxide pellets. Compressed gas from the canister 86 and carbon dioxide pellets from the canister 87 flow to a mixing valve 88 where the compressed gas picks up the carbon dioxide pellets into the air stream through the Venturi effect. The mixture of compressed gas and carbon dioxide pellets then flows down a dielectric hose 90 to the nozzles 70a, 70b and 70c where it is expelled. The dielectric hose 90 extends along the washer attachment 18 in tandem with the nozzle unit 64 as the nozzle unit moves along the boom arm 19 towards the distal end 46 of the washer attachment. Conversely, the dielectric hose 90 retracts into a retractable hose reel 94, which in this example is a spring-loaded hose reel, in tandem with the nozzle unit 64 as the nozzle unit moves along the boom arm 19 towards the proximal end 44 of the washer attachment 18. The canister 87 is thermally insulated to prevent the carbon dioxide pellets from melting. The canister 86 may also be thermally insulated or equipped with an after-cooler so that the compressed gas remains cool and does not melt the carbon dioxide pellets in the air stream. This prevents build-up and blockage as the mixture travels from the mixing valve 88 through the dielectric hose 90 to the nozzles 70a, 70b and 70c. The canisters 86 and 87 are mounted on the washer attachment 18 in this example but may be mounted on the vehicle 20 instead. The mixture of compressed gas and carbon dioxide pellets may then be pumped to the nozzles 70a, 70b and 70c by a dielectric hose which extends from the vehicle 20 along the telescopic boom arm 14, the dielectric boom arm 16 and the washer attachment 18 to the nozzle unit 64. The canisters 86 and 87 may also contain other washing mediums such as water.

The boom assembly 10 is shown in FIG. 7 mounted on the vehicle 20 with the telescopic boom arm 14 fully extended. This allows the boom assembly 10 to be used to work on a transmission tower 98. The telescopic boom arm 14 is provided with a sensor for determining an angular position thereof. In this example, the sensor is in the form of a telescopic boom inclinometer 118 but may be any suitable sensor. The telescopic boom inclinometer 118 signals a vertical angular position of the telescopic boom arm 14 to a controller 106 on the vehicle 20. The telescopic boom arm 14 is also provided with a distance sensor 120 which signals a length of the telescopic boom arm 14 to the controller 106. Likewise, the dielectric boom arm 16 is provided with a dielectric boom inclinometer 108 which signals an angular position of the dielectric boom arm 16 to the controller 106. Movement of the telescopic boom arm 14 and the dielectric boom arm 16 may be restricted by the controller 106, based on the relative positions of the telescopic boom arm and the dielectric boom arm, to prevent excess loading or a reverse moment from being applied to the boom assembly 10 when the operator 122 inputs a command using the controller 124. Similarly, the washer attachment 18 is provided with a sensor in the form of a washer attachment inclinometer 110 which signals an angular position of the washer attachment 18 to the controller 106. The washer attachment 18 is also provided with a rotational sensor 112 which signals a rotational position of the washer attachment 18 to the controller 106. The washer attachment 18 is further provided with a receiver 116 which receives commands from the controller 124 to actuate the nozzle unit 64 between the open configuration and the closed configuration. The receiver 116 also receives commands from the controller 124 to reciprocate the nozzle unit 64 along the boom arm 19 of the washer attachment 18. The receiver 116 further receives commands from the operator 122 using the controller 124 to turn on and off the mixing valve 88 which controls the flow of the pressured washing medium to the nozzles on the nozzle unit 64.

Referring now to FIGS. 8 and 9, the washer attachment 18 is shown in use with the insulator 104. The washer attachment 18 in this example is oriented such that the proximal end 44 thereof is adjacent to a top 130 of the insulator 104 and the distal end 46 thereof is adjacent to a bottom 132 of the insulator 104. The washer attachment 18 in this example is also positioned such that the nozzle unit 64 is aligned with a vertical axis 270 of the insulator 104. Once the nozzle unit 64 is aligned with the insulator 104, the washer claw 66 of the nozzle unit is moved to the closed configuration as best shown in FIG. 9. In the closed configuration, the shields 69 and 71 of the nozzle unit 64 completely surround a part of the insulator 104. This allows the entire circumference of the part of the insulator 104 to be washed by the nozzle unit 64. The mixing valve 88, shown in FIG. 4, is turned on to direct the pressured washing medium from the nozzles of the nozzle unit 64 inwardly towards the interior space 63 of the washer claw 66, thereby pressure washing contamination from the insulator 104. The shields 69 and 71 of the nozzle unit 64 surround the part of the insulator 104 being washed and reduce overspray from the pressure washing process which may cause electric arcing between nearby conductive components. Furthermore, the carbon dioxide pellets vaporize on contact with the insulator 104. The nozzle unit 64 is reciprocated along the boom arm 19 of the washer attachment 18 by the actuator 72 to wash the full length of the insulator 104.

Referring now to FIG. 10, the washer attachment 18 may be pivoted along the longitudinal axis 241 so that the proximal end 44 of the washer attachment is adjacent to the bottom 132 of the insulator 104 and the distal end 46 of the washer attachment is adjacent to the top 130 of the insulator 104. The washer attachment 18 may also be rotated along its longitudinal axis 260, for example, by 90° from the position shown in FIGS. 8 and 9. This allows the washer attachment to access the insulator while avoiding transmission lines and maintaining a safe limit of approach. This may be desirable in situations where insulators are paired together or extend from the transmission tower at different angles.

It will be understood by a person skilled in the art that the attachment is shown herein washing insulators on transmission towers by way of example only. The attachment may also be used to wash insulators mounted in other locations. Alternatively, the attachment may be used to wash other elongate objects such as windmill arms. In other applications, the attachment may be used to spray fluid other than washing medium, for example, paint to paint lattice towers.

It will further be understood by a person skilled in the art that many of the details provided above are by way of example only, and are not intended to limit the scope of the invention which is to be determined with reference to the following claims.

What is claimed is:

1. An articulated boom assembly comprising:
   a base;
   a primary boom arm extending from the base;
   a power system for actuating the primary boom arm between an extended position and a retracted position; and
   an attachment operatively connected to the primary boom arm, the attachment supporting a nozzle for cleaning insulators of high voltage transmission lines and the attachment including an actuating mechanism for reciprocating the nozzle along a length of the attachment, wherein the actuating mechanism for reciprocating the nozzle is independent of the power system for actuating the primary boom arm between an extended position and a retracted position.

2. The boom assembly as claimed in claim 1 wherein the nozzle is mounted on a nozzle unit having a first jaw member and a second jaw member.

3. The boom assembly as claimed in claim 2 wherein the first jaw member and the second jaw member have respective ends thereof and the nozzle unit is moveable between an open configuration, in which the ends of the first jaw member and the second jaw member are spaced-apart, and a closed configuration in which the ends of the first jaw member and the second jaw member are adjacent to each other.

4. The boom assembly as claimed in claim 1 wherein the attachment is operatively connected to the primary boom arm by an actuator.

5. The boom assembly as claimed in claim 1 further including a secondary boom arm pivotably coupled to the primary boom arm, wherein the attachment is operatively connected to the primary boom arm by the secondary boom arm and wherein the power system for actuating the primary boom arm is a hydraulic system and the secondary boom arm is pivoted by the power system.

6. The boom assembly as claimed in claim 5 wherein the attachment is operatively connected to the secondary boom arm by an actuator.

7. The boom assembly as claimed in claim 5 wherein the attachment includes an actuating mechanism for reciprocating the nozzle along the length of the attachment which is independent of the power system for actuating the primary boom arm and pivoting the secondary boom arm.

8. The boom assembly as claimed in claim 5 further including an actuator near a proximal end of the secondary boom arm for pivoting the secondary boom arm relative to the primary boom arm.

9. An articulated boom assembly comprising:
   a base;
   a primary boom arm extending from the base;
   a secondary boom arm pivotably coupled to the primary boom arm;
   a power system for actuating the primary boom arm between an extended position and a retracted position, and for pivoting the secondary boom arm; and
   an attachment operatively connected to the secondary boom arm, the attachment including a first jaw member, a second jaw member, a plurality of nozzles for cleaning insulators of high voltage transmission lines which are spaced-apart on the first jaw member and the second jaw member, and an actuating mechanism for reciprocating the first jaw member and the second jaw member along a length of the attachment, wherein the actuating mechanism for reciprocating the nozzle is independent of the power system for actuating the primary boom arm and pivoting the secondary boom arm.

10. The boom assembly as claimed in claim 9 wherein the first jaw member and the second jaw member have respective ends thereof and are moveable between an open configuration, in which the ends of the first jaw member and the second jaw member are spaced-apart, and a closed configuration in which the ends of the first jaw member and the second jaw member are adjacent to each other.

11. The boom assembly as claimed in claim 9 wherein the attachment is operatively connected to the secondary boom arm by an actuator.

12. The boom assembly as claimed in claim 9 wherein the plurality of nozzles is directed inwardly towards an interior space defined by the first jaw member and the second jaw member.

\* \* \* \* \*